Sept. 20, 1938.  F. SMITH  2,130,569
PARACHUTE APPARATUS
Filed March 31, 1937   3 Sheets-Sheet 1
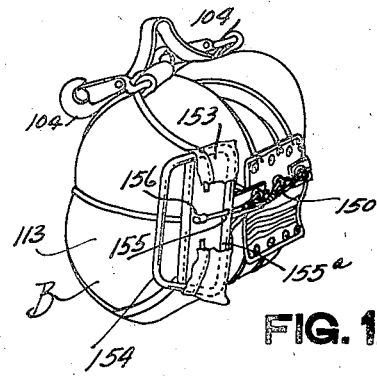
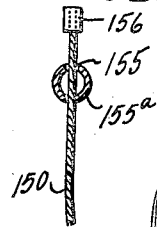
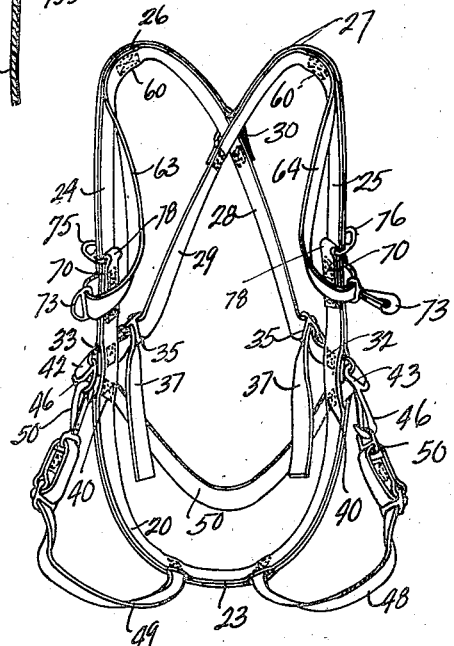
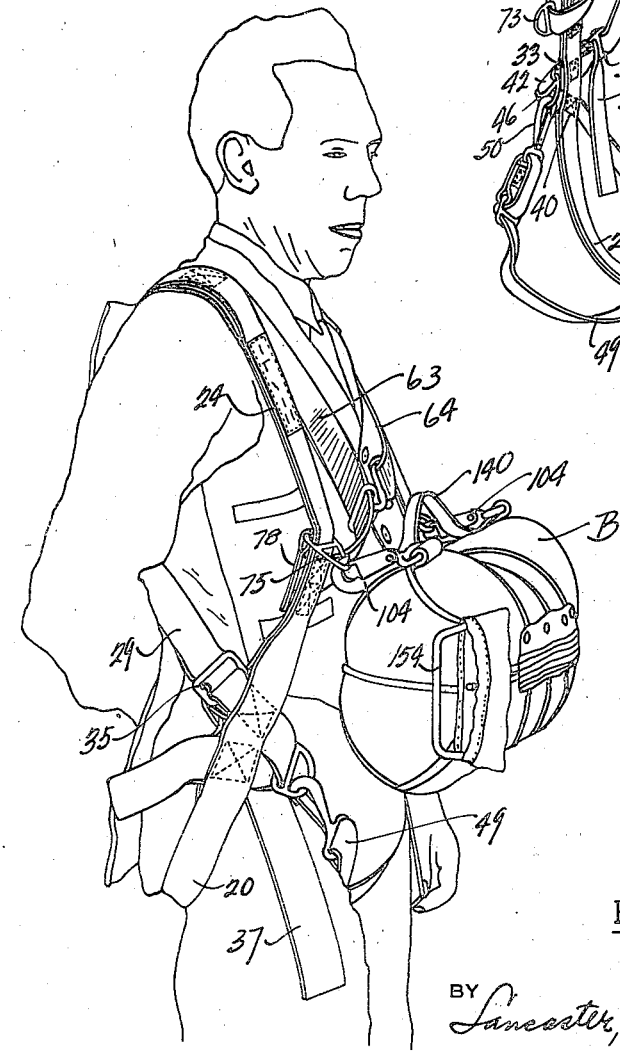
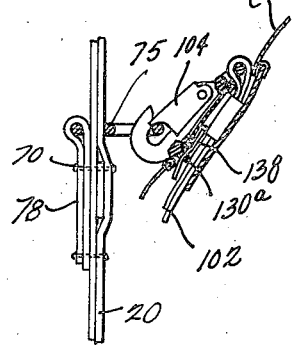
INVENTOR.
Floyd Smith
BY Lancaster, Allwine and Rommel
ATTORNEYS.

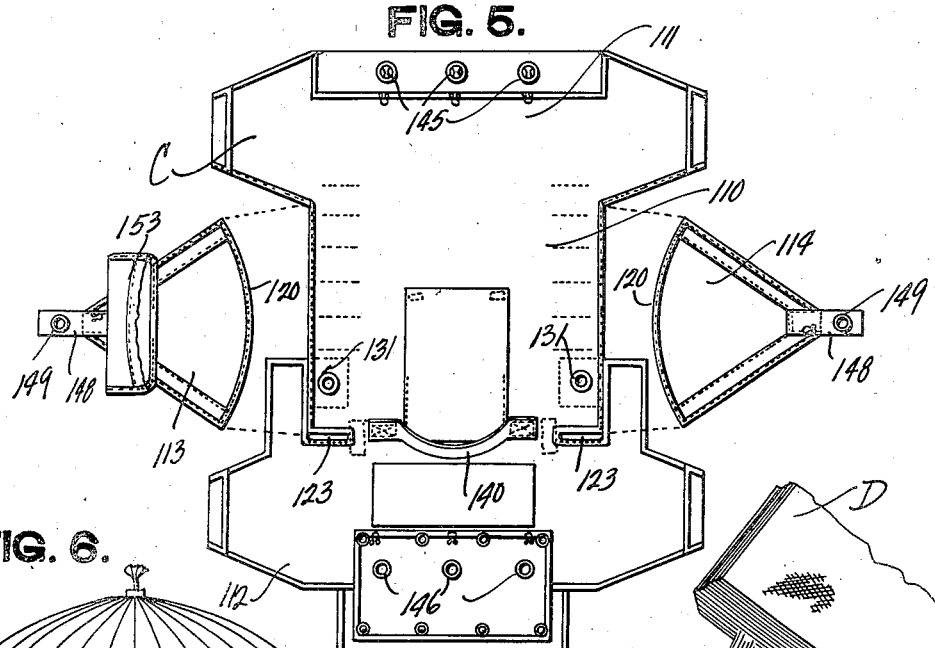
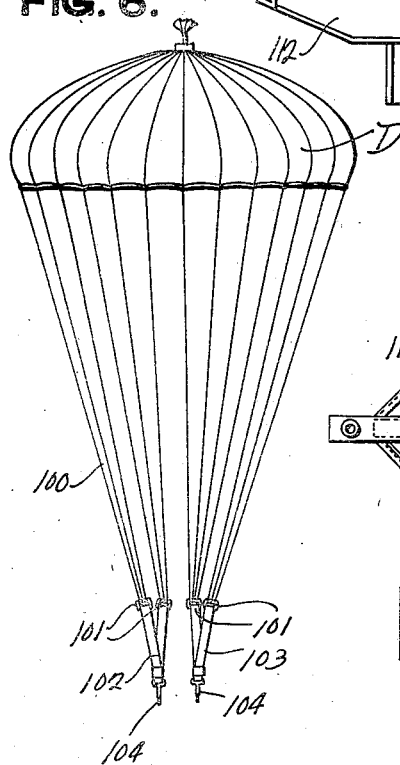
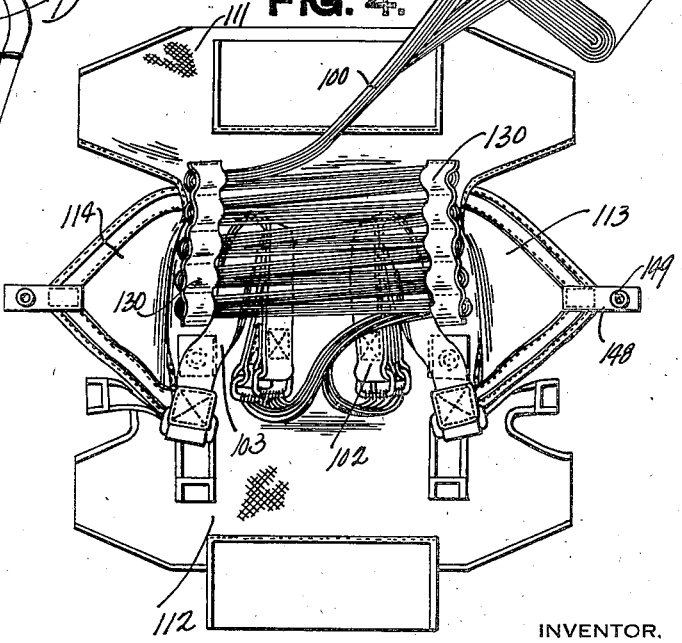

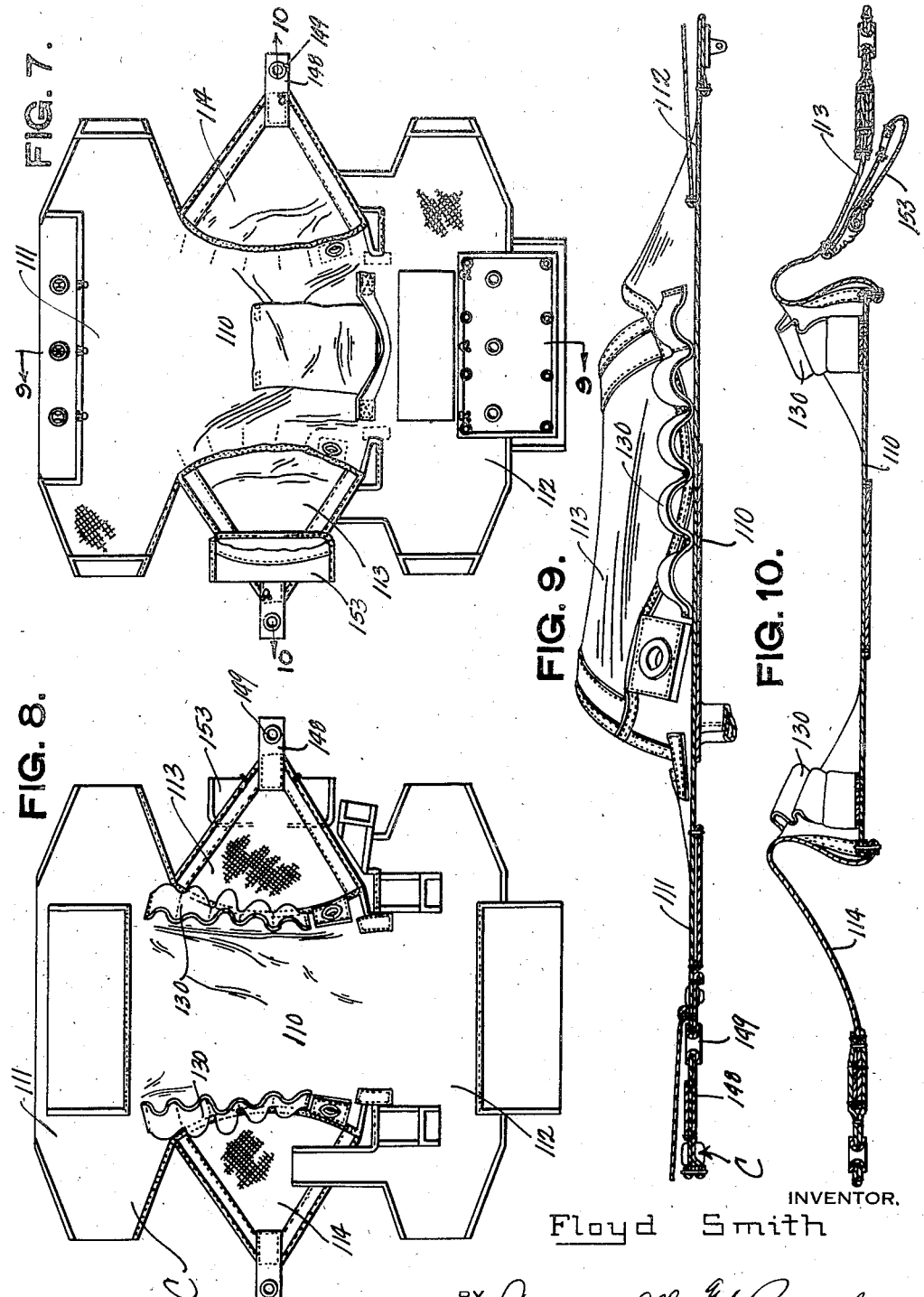

Patented Sept. 20, 1938

2,130,569

UNITED STATES PATENT OFFICE 2,130,569

PARACHUTE APPARATUS

Floyd Smith, Buffalo, N. Y., assignor to Irving Air Chute Co., Inc., Buffalo, N. Y., a corporation Application March 31, 1937, Serial No. 134,109

6 Claims. (Cl. 244—148)

This invention relates to improvements in parachute apparatus.

The primary object of this invention is the provision of parachute apparatus comprising a harness and a quick connector pack; the latter being so constructed that the container will float away from the wearer upon deployment of the parachute.

A further object of this invention is the provision of parachute apparatus wherein a harness and a quick connector pack are used; the latter having a container which is not reinforced by any rigid expedient, such as wire frames or other stiffening members or frames; the canopy and its coupling means being so related to the container that when the coupling means of the pack is connected with the coupling means of the harness, and after pulling the rip cord the soft container will float freely away without injuring or impeding the wearer.

A further object of this invention is the provision of improved means in the nature of a rip cord which has a slidable connection with its handle, so that premature release opening of the pack is prevented.

A further object of this invention is the provision of an improved soft parachute pack.

A further object of this invention is the provision of an improved non-rigid and flexible container for parachutes of a nature to permit of the compact assemblage of a parachute therein.

A further object of this invention is the provision of improvements in parachute packs of the nature shown in U. S. Patent #1,958,000.

Other objects and advantages of the invention will be apparent during the course of the following detailed description.

In the accompanying drawings, forming a part of this specification, and wherein similar reference characters designate corresponding parts throughout the several views, Figure 1 shows the improved parachute apparatus including an improved harness and soft pack in releasably coupled relation with each other upon a wearer.

Figure 1ª is a perspective view of the improved soft pack, with part of the pocket cut away to show the rip cord construction.

Figure 1ᵇ is an enlarged sectional view taken through a portion of the rip cord and handle construction.

Figure 2 is a perspective view of the improved harness.

Figure 3 is a fragmentary sectional view showing the complementary coupling parts of the pack and harness and the relative construction and assemblage thereof.

Figure 4 is a perspective view of the improved soft pack with the container opened, showing the assemblage of shroud lines and the pocketing means therefor.

Figure 5 is an external view of the improved container of the pack, showing the end flaps disassembled from the body of the container, to better designate the construction and the reason why the body of the container will maintain somewhat of a cup-shape to facilitate wrapping of the container about the canopy without wrinkling and distortion.

Figure 6 is a side elevation of the improved parachute in a deployed condition, but free of connection with a parachute harness.

Figure 7 is an outer view of the improved soft pack container in its open condition.

Figure 8 is an inner view of the improved soft pack container in its open condition.

Figures 9 and 10 are cross sectional views taken substantially on their respective lines in Figure 7 of the drawings.

In the drawings, wherein similar reference characters designate corresponding parts throughout the several views, the letter A may generally designate a form of harness with which the improved soft pack B may be used.

The improved harness A is of the multiple release type, although some characteristics thereon may be adaptable for use with the single point quick release type such as shown in U. S. Patent #1,899,656. In the main it comprises a body supporting sling 20, consisting of a double thickness of webbing. These thicknesses are stitched together and provide a seat portion 23 upon which the wearer sits during a parachute descent. Side riser portions 24 and 25 extend from the seat portion and comprise part of the sling. They continue upwardly to provide shoulder straps 26 and 27, and the latter extend downwardly to provide crossed back straps 28 and 29. The double thickness of webbing of the supporting sling ends at the crossing point of the back straps 28 and 29, where a slip connection 30 is provided. The back straps 28 and 29 from the crossing point 30 extend in relative divergence downward and are permanently stitched at 32 and 33 to the riser webs 25 and 24 at a location normally below the peak of the hips of the wearer. In each of the back straps 28 and 29 adjacent to the connections 32 and 33 there is provided an adjustment for the back strap. This adjustment consists of providing an adapter 35 in each of the back straps, secured to a small looped portion of the back strap, which is the portion directly connected with the sling. The ends 37 of the back straps 28 and 29 are secured through these adapters in an adjustable relation (see Figure 2 of the drawings).

The back straps 28 and 29 extend beyond their connecting points 32 and 33 on the riser webs of the supporting sling, in a forward direction, and are then turned back and stitched at 40 on the ends of the seat strap of the sling at a location below the points 32 and 33. This provides strap loops 42 and 43 on the supporting sling at each riser web 24 and 25, on which leg strap coupling parts 46 are secured. They may be either coupling rings or snap fasteners, as desired. The hip strap 50 is extended horizontally so as to be at a location appreciably below the small of the back of the wearer in order to prevent the parachutist from falling rearwardly through the harness and retain the parachutist in the harness without liability of injury at the time of shock opening of the parachute canopy.

The harness additionally includes leg straps 48 and 49 secured to the intermediate portion of the seat strap 23 and having coupling parts 50 thereon for complementary association with the coupling parts 46 above mentioned. These leg straps each have an adjustment therein, of well known construction.

It will be noted from Figure 2 of the drawings that the inner layer or thickness of the supporting sling terminates at the shoulder straps and that the back straps 28 and 29 from the shoulder stitching point 60, shown in Figure 2, comprise a layer which is extended forwardly at each of the riser webs, to provide the breast straps 63 and 64 which relatively converge towards each other and are permanently connected at locations 70 on the riser webs above the stitch locations 32 and 33 of the back straps. On these loose breast straps 63 and 64 are disposed complementary coupling parts 73.

Pack coupling rings 75 and 76 are permanently secured in a definitely fixed relation upon the riser webs 24 and 25 respectively, at a location immediately above the breast strap connections 70. These couplings are preferably rings, and they outstand normal to the plane of the riser webs on which they are located; the connection being such that at all times they will outstand in this relation to facilitate connection of the pack coupling parts thereto. Stiffening loops 78 are secured to the riser webs in a stitched relation below the coupling parts 75 in order to stiffen the riser webs at this location and thus facilitate the application of the coupling parts of the pack to the coupling parts 75. These straps 78 also form loops thru which the coupling parts 75 are connected, as shown in Figure 3.

Referring to the soft pack B, the same includes a flexible sheet-like container C housing a parachute canopy D therein.

The parachute canopy D is of any desired construction, and as shown in Figure 6 it includes the shroud lines 100 which terminate in four bunches and are secured to D-rings 101, attached to the upper ends of suspension straps 102 and 103. The suspension straps 102 and 103 are each composed of two lengths of material having the D-rings 101 at the free ends thereof. At the bight portions the harness connecting couplings 104 are positioned. These couplings are preferably of the snap variety and are adapted to connect with the complementary coupling parts 75 and 76 of the harness in order to connect the pack B to the harness.

The container C is of improved construction and free of rigid framework. This container is adapted to float away upon deployment of the parachute in order not to obstruct the wearer in any sense whatsoever, and the fact that it is unreinforced will prevent injury to the wearer. The container construction is best illustrated in Figures 4, 5, 7 and 8 of the drawings. It includes a square or rectangular shaped body portion 110 having wide end flaps 111 and 112 which are preferably integral therewith. Side flaps 113 and 114 are separate pieces but adapted to be permanently stitched to the sides of the body portion 110 so as to shape the latter in rather a cup or basket shape to facilitate the application of the folded parachute in the container, without creasing or undue wrinkling of the latter. To that end, as shown in Figure 5 of the drawings, the side marginal portions of the body portion 110 are preferably straight. The ends flaps 113 and 114 are generally of triangular formation and the margins 120 thereof, which are adapted to be permanently stitched to the side margins of the body 110, are arcuated. When these marginal portions of the end flaps are secured to the side margins of the body portions 110 the latter is rather cupped at the sides thereof to facilitate smooth application of the container when the parachute is packed therein.

The flap 112 is so connected with the body portion 110 as to provide slits 123, shown in Figure 5 of the drawings, through which suspension lines of the canopy extend so that the coupling parts 104 may lie exteriorly of the container when the pack is closed.

It is to be particularly noted that none of the flaps of the sheet of material which comprises the container are reinforced, and the body portion likewise is not reinforced or stiffened in any manner. This distinguishes from conventional practice, since parachute pack containers are ordinarily wire frame stiffened, particularly portions whereon the shroud lines are folded.

Suitable shroud line pockets 130 are provided on the inner side of the body portion 110 of the container, along the marginal portions of the side flaps 113 and 114, as shown in Figure 4.

It is to be particularly noted that the parachute canopy, the shroud lines and suspension lines 102 and 103 are entirely disconnected from the parachute container C. The suspension lines 102 and 103 are rather short and disposed so that the coupling snap fasteners 104 are exteriorly of the pack; the suspension lines 102 and 103 being folded on the inside of the body portion of the pack, as shown in Figure 4. The shroud lines are bunched together and engaged in a zig-zag relation between the pockets 130 and the parachute canopy is folded and packed in the usual manner on top of the shroud lines. The flaps 111 and 112 are then folded over the parachute canopy, in the usual manner, and the side flaps 113 and 114 are then folded over the ends of the pack parachute mass. Of course the projecting side portions of the flaps 111 and 112 underlie the flaps 113 and 114.

As is shown in Figure 3 of the drawings each of the snap fastener couplings 104 is provided with an apertured stud 130a thereon. The body portion 110 of the container is provided with eyelets 131 adjacent to the slits 123 through which these apertured studs 130a extend. Each of the suspension webs 102 and 103 adjacent to its respective coupling 104 is provided with a flexible wire pin 138 adapted to extend through the aperture of the stud 130ª when the latter is projected into the pack. This tightly holds the coupling 104 externally upon the container when the latter is in packed condition. The position of the couplings 104 is thus secured in a definite and fixed relation against swinging or displacement, so that when the wearer desires to apply the pack upon the harness it is not necessary to fumble either with the couplings 104 or with the coupling rings 75 and 76 of the harness.

It is entirely conceivable that the coupling snaps 104 may be located on the harness and the coupling rings of the harness located on the suspension lines 102 and 103. This would merely reverse the position of the complementary coupling parts of the harness and pack.

It will be noted from Figures 1 and 1ª of the drawings that when the parachute canopy is packed, as above described, in the container C, the pack will assume a rather cylindrical shape with the coupling snaps 104 located on the outer side of the body portion 110 of the container when in such position that the individual may readily grasp the ends of the pack and snap the couplings 104 quickly on the couplings of the harness. If desired a supporting handle 140 for the pack may be placed on the container at a location between the slits 123.

As to the fastening of the container, apertured studs 145 are provided in line upon the flap 111 adapted for extension through suitable eyelets or grommets 146 on the other flap 112. The end flaps 113 and 114 have reinforcing extension tabs 148 thereon provided with eyelets or grommets 149 adapted for extension over the end studs 145 in a relation which will be apparent from the drawings.

As shown in Figure 1ª of the drawings a wire rip cord 150 is provided, having the usual retaining wire pins thereon for extension thru the apertures of the studs 145, in order to hold the grommets on the studs and the container closed with the canopy packed therein. The end flap 113 is provided with a pocket 153 adapted, as shown in Figure 1ª of the drawings, to house a rip cord handle 154. The latter is provided with a base bar 155ª having a central opening 155 through which the rip cord 150 is slidable. The rip cord 150 at one end is provided with a stud 156 to prevent displacement of the rip cord from the handle 154, and at the opposite side of the base bar 155ª the rip cord 150 is prevented from detachment from the handle by means of the retaining pins above described. The reason for slidably extending the rip cord 150 on the base bar 155ª is to prevent premature release opening of the parachute pack due to eccentricities in packing or variances in usual packing dimensions. As shown in Figure 1ª, when the pack is in closed condition the handle 150 is located in the pocket 153 and with the retaining pins of the rip cord in position in the apertures of the studs the retaining lug 156 on the end of the rip cord 150 is still spaced an inch or more from the base bar 155ª. This distance enables a length play of the rip cord 150 sufficient to take care of all discrepancies during packing. Thus there will be no liability of premature release or opening of the pack, due to improper length of the rip cord or improper positioning of the handle in its pocket.

With respect to the harness and soft pack above described it will be apparent how the parts are assembled. It will also be obvious that upon opening of the pack by pulling the rip cord the parachute will be deployed and the soft pack will float away.

Various changes in the shape, size, and arrangement of parts may be made to the form of invention herein shown and described, without departing from the spirit of the invention or the scope of the claims.

I claim:

1. A detachable emergency parachute pack comprising a container, a parachute for releasable housing in the container including a canopy and shroud lines, coupling means connected with the shroud lines adapted for releasable connection with a wearer's harness, fastener means for releasably closing the container, and means releasably connecting the coupling means externally on the container, said container being otherwise disconnectible from the parachute canopy and its shroud lines so that the said container will float away from the wearer upon opening of the pack as an incident to load supporting deployment of the parachute canopy.

2. A detachable emergency parachute pack comprising a completely flexible soft container without rigid wall shaping reinforcement in any of the walls thereof, a canopy, suspension means for the canopy, coupling means connected with the suspension means, and means releasably connecting the coupling means externally upon the container for releasable connection with the coupling means of a harness, said container being free of any permanent connection with any other part of the parachute pack so that when the pack is opened the soft container will float freely away.

3. A detachable emergency parachute pack comprising a container, a parachute for releasable housing in the container including a canopy and shroud lines, coupling means connected with the shroud lines adapted for releasable connection with a wearer's harness, fastener means for releasably closing the container, and means releasably connecting the coupling means externally on the container in non-wobbling relation so that said coupling means may be attached without fumbling with a complementary coupling of a wearer's harness, said container being otherwise disconnectible from the parachute canopy and its shroud lines so that the said container will float away from the wearer upon opening of the pack as an incident to load supporting deployment of the parachute.

4. A detachable emergency parachute comprising a completely flexible soft container without rigid wall shaping reinforcement in any of the walls thereof, a canopy, suspension means for the canopy, coupling means connected with the suspension means, and means releasably connecting the coupling means in non-wobbling relation externally upon the container for releasable connection with complementary coupling means of a harness, said container being free of any permanent connection with any other part of the parachute pack so that when the pack is opened the soft container will float freely away.

5. A detachable emergency parachute pack comprising a container, a parachute releasably housed in the container including a canopy, shroud lines and a pair of coupling parts for releasable connection with complementary coupling parts of a wearer's harness, and means releasably connecting the pack coupling parts externally on the container, the container being free of any permanent connection with any part of the parachute pack so that it will float away from the wearer upon opening of the pack as an incident to load supporting deployment of the parachute canopy.

6. An emergency attachable parachute pack comprising a container, a parachute releasably housed in the container including a canopy and shroud lines and a pair of coupling parts, and means releasably connecting the coupling parts externally on the container in definitely spaced non-wobbling position so that they can be attached without fumbling to complementary coupling parts of a wearer's harness, the container being free of any permanent connection with any part of the parachute pack so that it will float away from the wearer upon opening of the pack as an incident to load supporting deployment of the parachute canopy.

FLOYD SMITH.